United States Patent [19]
Sumner et al.

[11] Patent Number: 5,671,109
[45] Date of Patent: *Sep. 23, 1997

[54] DISK DRIVE CARTRIDGE DOOR

[75] Inventors: Wayne A. Sumner, Ogden; Allen T. Bracken, Layton; David W. Griffith, Layton; David E. Jones, Layton; Edward L. Rich, Ogden, all of Utah

[73] Assignee: Iomega Corporation, Roy, Utah

[*] Notice: The term of this patent shall not extend beyond the expiration date of Pat. No. 5,570,252.

[21] Appl. No.: 550,819

[22] Filed: Oct. 31, 1995

Related U.S. Application Data

[63] Continuation-in-part of Ser. No. 482,010, Jun. 7, 1995, Pat. No. 5,570,252.
[51] Int. Cl.⁶ ........................................... G11B 23/03
[52] U.S. Cl. .................................... 360/133; 369/291
[58] Field of Search ........................ 360/133, 132; 369/291

[56] References Cited

U.S. PATENT DOCUMENTS

| | | |
|---|---|---|
| 4,045,821 | 8/1977 | Fujikura ........................... 360/132 |
| 4,400,748 | 8/1983 | Bauck et al. ....................... 360/99 |
| 4,864,452 | 9/1989 | Thompson et al. ................ 360/133 |
| 4,901,173 | 2/1990 | Jones et al. ..................... 360/99.04 |
| 5,216,558 | 6/1993 | Griffith et al. .................. 360/99.06 |
| 5,381,402 | 1/1995 | Lee et al. ......................... 369/291 |
| 5,481,420 | 1/1996 | Cardona et al. .............. 360/133 X |
| 5,515,358 | 5/1996 | Goto .............................. 360/133 X |

*Primary Examiner*—John H. Wolff
*Attorney, Agent, or Firm*—Woodcock Washburn Kurtz Mackiewicz & Norris LLP

[57] ABSTRACT

A cartridge for a magnetic disk drive has a rigid shell and a flexible door which covers an opening through which read/write heads engage the recording medium. The flexible door is guided outside of the shell to an open position as the cartridge is inserted into the drive. A projection on a flexible arm in the drive catches a hole in the flexible door to open it as the cartridge is inserted into the drive. The door which opens along the outside of the cartridge conserves space so that the recording medium can be large for a given form factor drive.

27 Claims, 11 Drawing Sheets

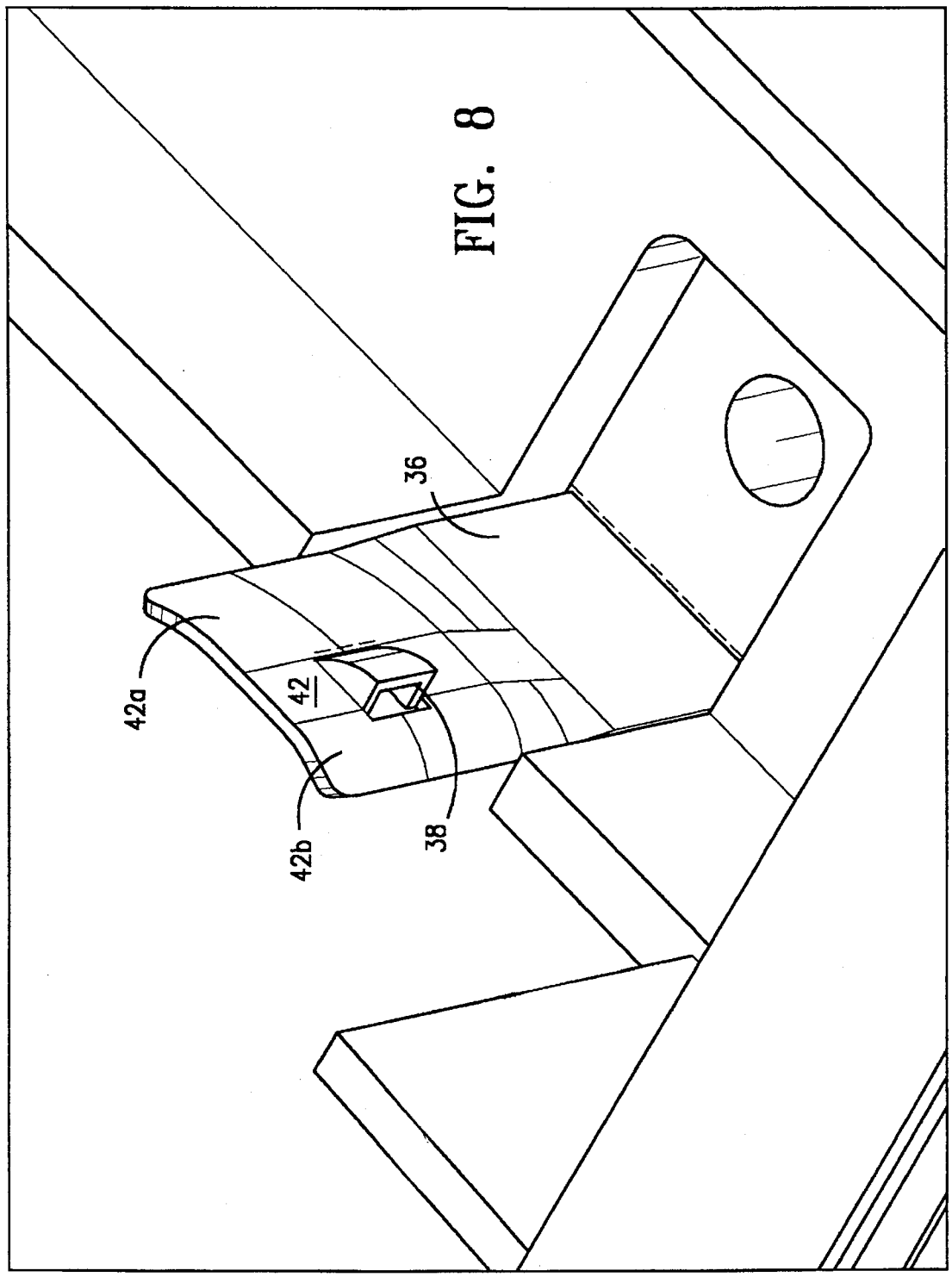

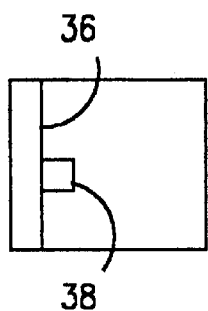
FIG. 9A
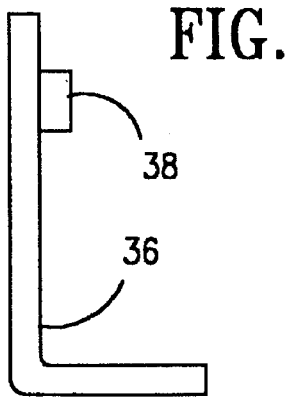
FIG. 9B
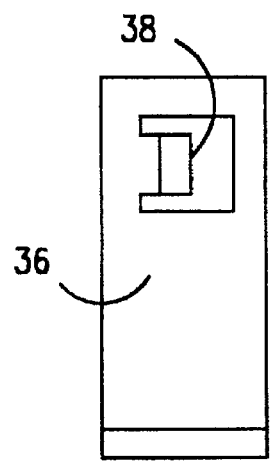
FIG. 9C
FIG. 10
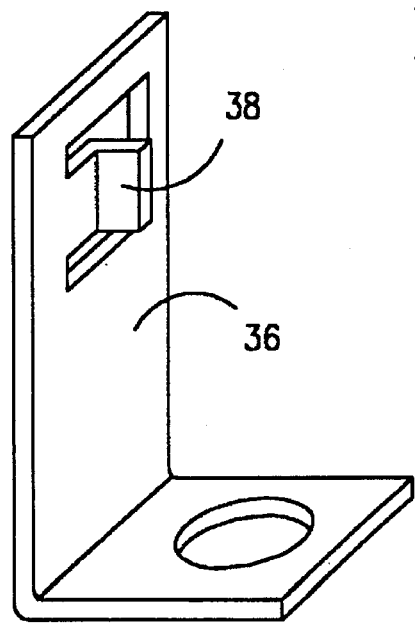

DISK DRIVE CARTRIDGE DOOR

RELATED APPLICATION

This application is a continuation-in-part of U.S. application Ser. No. 08/482,010 filed Jun. 7, 1995, now U.S. Pat. No. 5,570,252 entitled "Disk Drive Cartridge Door" by Sumner et at.

BACKGROUND OF THE INVENTION

This invention relates to data storage drives and more particularly, to a removable cartridge for magnetic disk drives.

Magnetic disk drives which write and read digital data from flexible magnetic disks have been extensively used. "Floppy disk drives" have been extensively used for small, so-called microcomputer systems, for word-processing applications and the like. The flexible disk cartridge includes a relatively thin, flexible jacket which is inserted into the floppy disk drive.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive. Rigid disks enclosed in a rigid, removable cartridge, or shell have also been used. U.S. Pat. No. 4,864,452—Thompson, et al is an example of such a drive.

"Bernoulli" disk drives having performance characteristics similar to that of Winchester drives, but with removable cartridges, have been developed. A flexible magnetic disk is enclosed in a rigid box which is normally completely closed. U.S. Pat. No. 4,400,748—Bauck, et al and related patents to the common assignee show such drives using Bernoulli stabilized flexible disks. U.S. Pat. No. 4,901,173—Jones et al and related patents to a common assignee, show improvements which relate to so-called "half height" drives.

The cartridges for these drives have a door which closes the cartridge when it is removed from the drive. This prevents debris from contaminating the magnetic recording medium when the cartridge is not in the drive. When the cartridge is inserted into the drive, this door slides to an open position to provide access for the magnetic recording heads to engage the recording medium.

U.S. Pat. No. 5,216,558—Griffith, et al shows a drive for a rigid cartridge in which the cartridge door slides to an open position inside of the cartridge. In the aforementioned Thompson, et al patent, the door also slides to an open position inside the cartridge. In these drives, and in the cartridges used therein, space is at a premium. The cartridge has a narrow width into which the door must fit. This width is constrained by the relative size of the disk drive form factor. Also, the size of the disk relative to size of the casing severely limits the amount of room which is available inside the cartridge. It is desirable to have the disk occupy as much space within the cartridge as possible. This provides the maximum data storage capacity for a given drive form factor.

It is an object of the present invention to provide a cartridge with a sliding door which optimizes the amount of space available for the recording medium for a given form factor drive.

SUMMARY OF THE INVENTION

In accordance with the present invention, a thin, flexible door slides in narrow parallel tracks in the two halves of the cartridge shell. The door travels in tracks which guide the door outside of the cartridge parallel to the side of the cartridge when it is inserted into the drive. This exposes the disks in the cartridge for access by read/write heads.

A small projection on the end of a flexible arm catches the cartridge door, which is initially in its closed position, and pulls it out and along side the cartridge into the open position as the cartridge is inserted into the drive. The flexible arm insures that the projection will catch the cartridge door no matter where the cartridge is located in the drive opening. Special curved surfaces around the small projection control its penetration into a groove along the cartridge side.

The narrow space constraint into which the door must fit is caused by the relative size of the drive form factor and the disk size in the cartridge. Because the door slides outside of the cartridge, space inside of the cartridge is conserved.

The foregoing and other features, advantages and objects of the invention will be better understood from the following more detailed description and appended claims.

SHORT DESCRIPTION OF THE DRAWINGS

FIG. 8 shows the projection which opens the door;

FIGS. 9A–9C are top, from and right side view of another embodiment of the projection;

FIG. 10 is an isometric view of the projection of FIGS. 9A–9C;

DESCRIPTION OF THE PREFERRED EMBODIMENT

Figure 2:
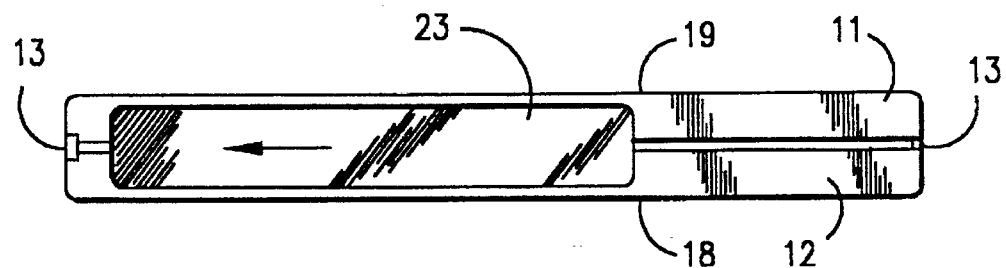
FIG. 2 is a front view of the cartridge.
Figure 1:
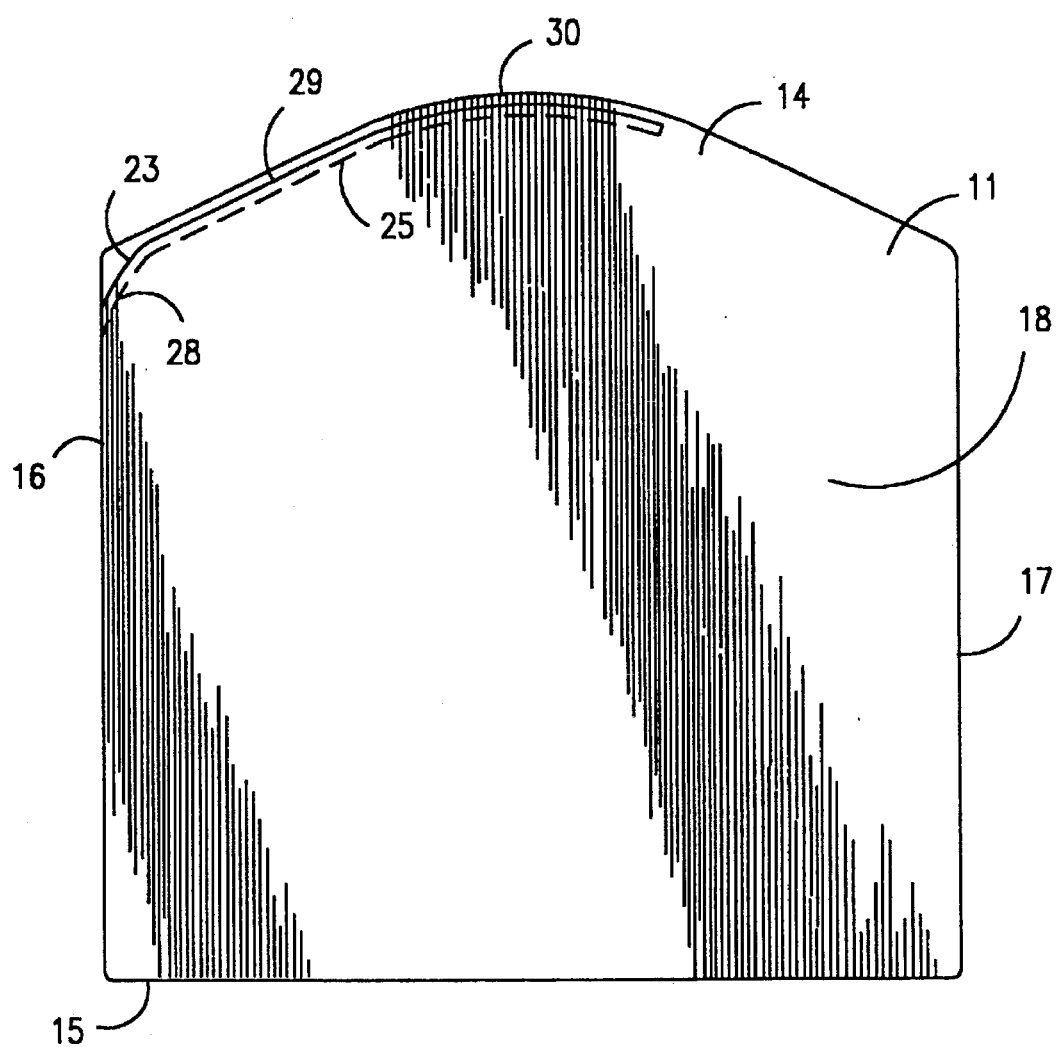
FIG. 1 shows a top view of the cartridge of the present invention.
Figure 3:
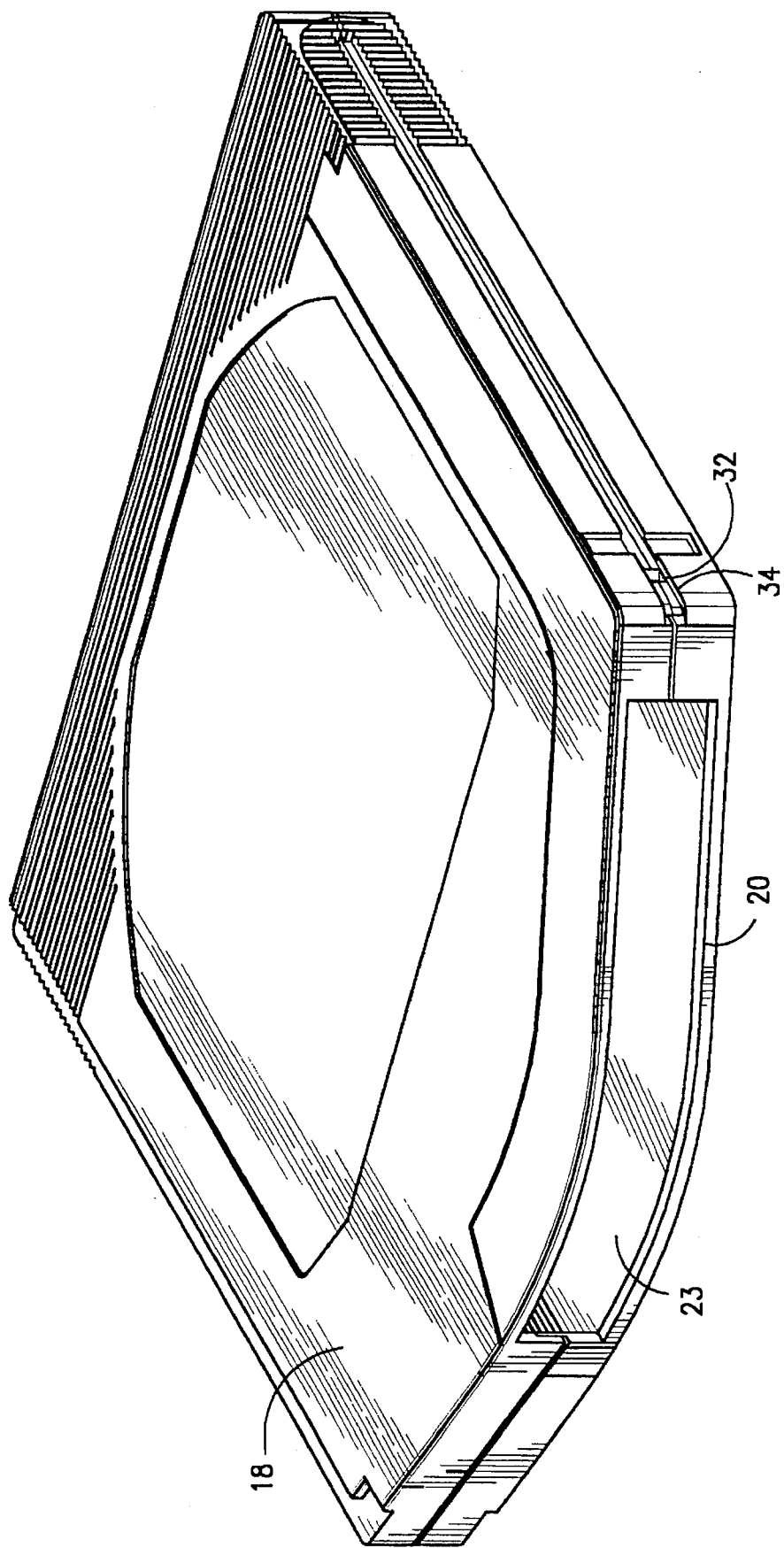
FIG. 3 is an isometric view of the cartridge with the door closed.
Figure 4:
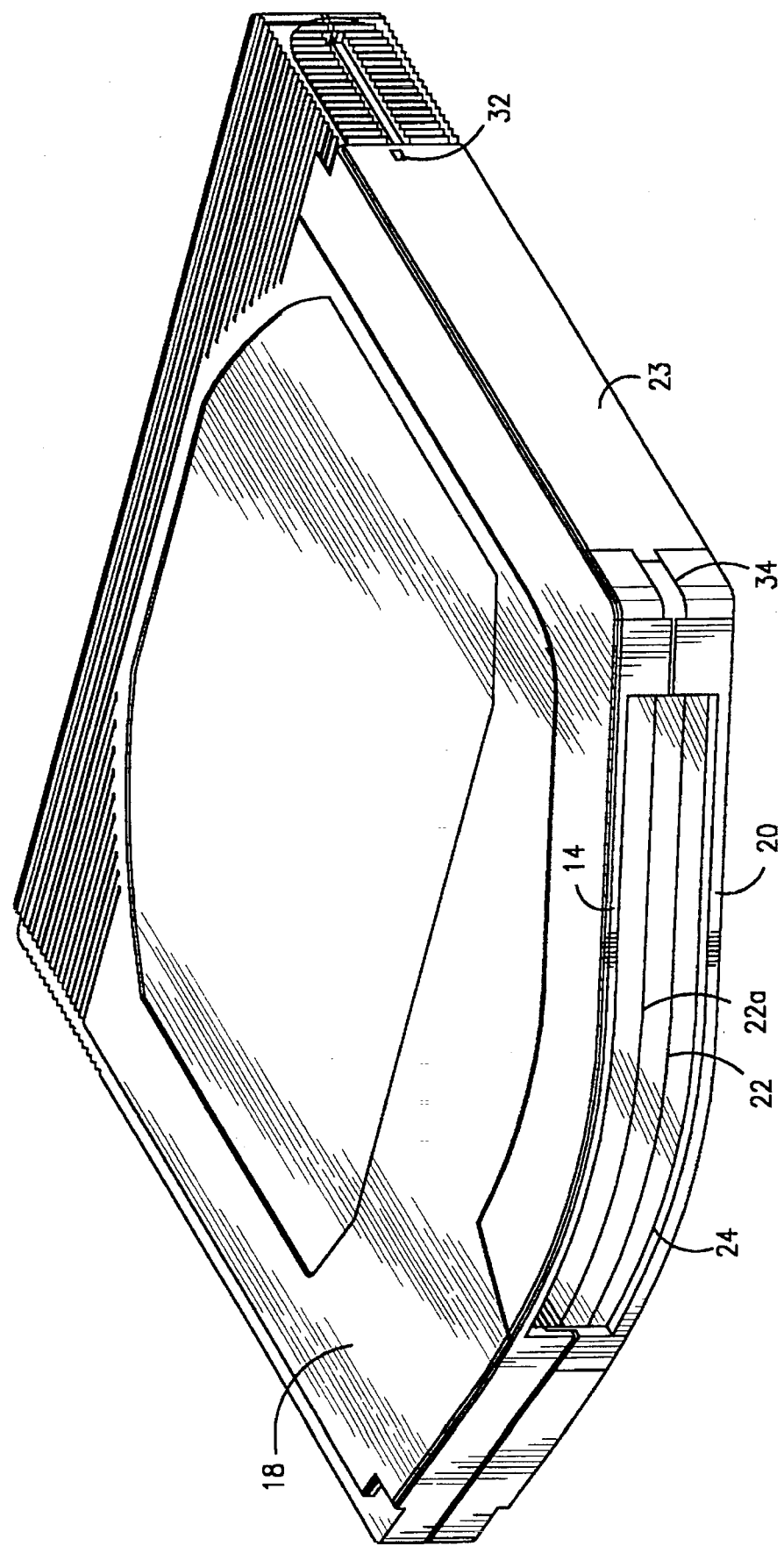
FIG. 4 is an isometric view of the cartridge with the door open.
Figure 5:
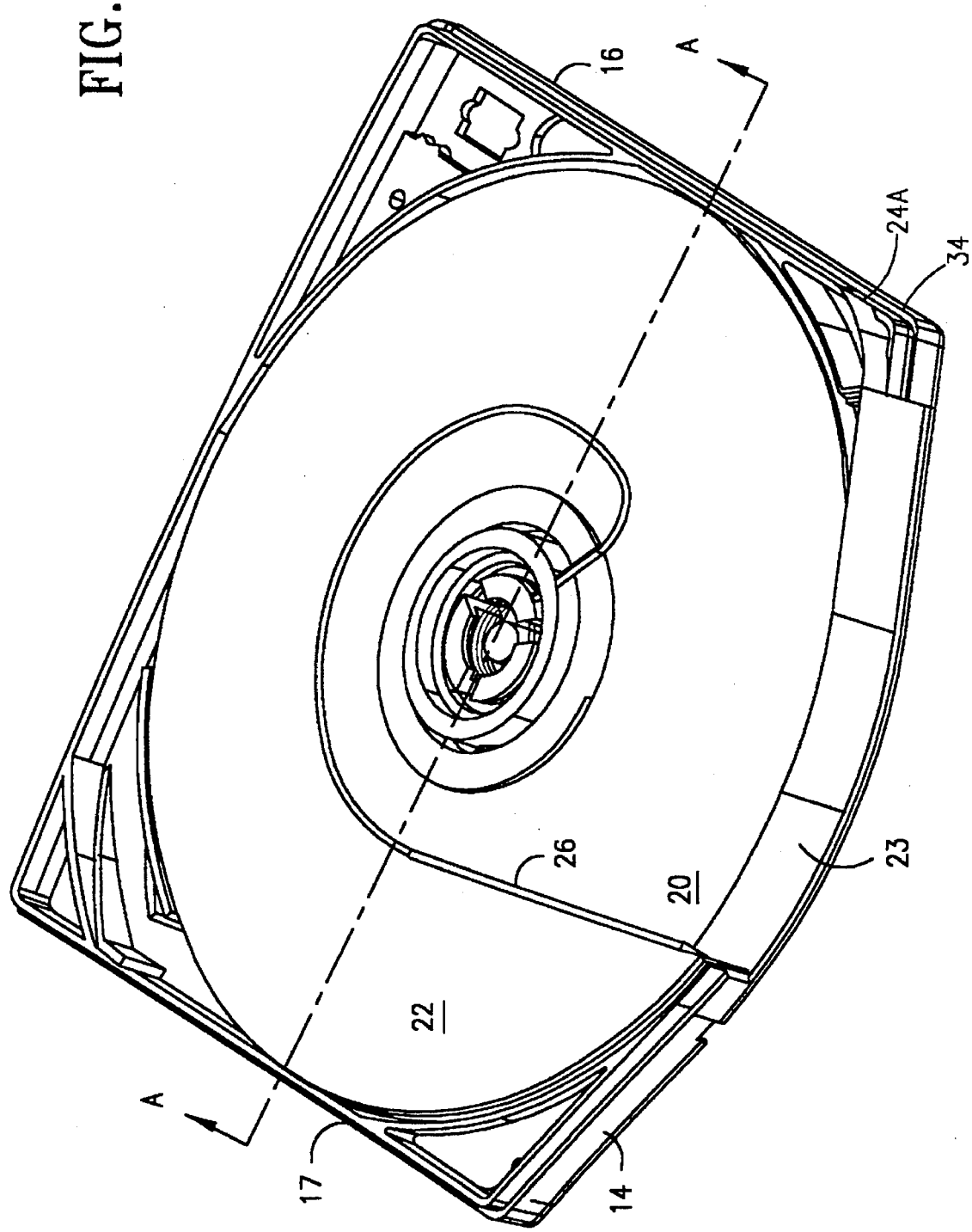
FIG. 5 shows an isometric view of the cartridge with the top shell removed.

FIGS. 1–5 show a cartridge having two halves 11 and 12 joined together at 13. The cartridge has a front 14, a back 15 and two sides 16 and 17 between substantially flat, planar surfaces 18 and 19. An opening 20 in the front of the cartridge provides access by the read/write heads 21 (FIG. 7) to the recording disks 22, 22A (FIG. 4). A flexible door 23 covers the opening when the cartridge is removed from the drive.

Track 24 (FIG. 4) and a corresponding track 25 (FIG. 1) in the top half shell, guide the door outside of the shell when the door is opened. The tracks extend along the front 14 and guide the door to a position along one side 16 of the shells when the door is opened. The flexible door 23 slides in the tracks from a closed position, shown in FIG. 3, in which it covers the opening 20, to the open position as shown in FIG. 4. The door 23 slides along the outside of the shell along the side 16 when the cartridge is inserted into the drive. The spring 26 biases the door into the closed position.

The cartridge has a small radius 28 at the corner between the side 16 and the front of the cartridge. A straight section 29 is between the small radius 28 and the large radius 30 at the front of the cartridge. The door is sufficiently flexible to follow the door tracks around the large radius 30, through the straight section 29, and the small radius 28.

The door 23 has a width approximately co-extensive with the width of the shell. The length of door 23 is sufficient to cover the opening 20 in the closed position and short enough to fit along the side 16 of the cartridge when it is in the open position. The length and width of the door are constrained by the form factor of the drive and the size of the recording disks 22 and 22A which occupy most of the interior of the cartridge.

The flexible door 23 has a hole 32 (FIGS. 3 and 4) at the end thereof. A projection 38 on the drive catches the hole 32 when the cartridge is inserted into the drive to pull the door to the open position. A groove 34 in the corner of the cartridge, at the end 24A of track 24, guides the projection to the hole 32.

Figure 6:
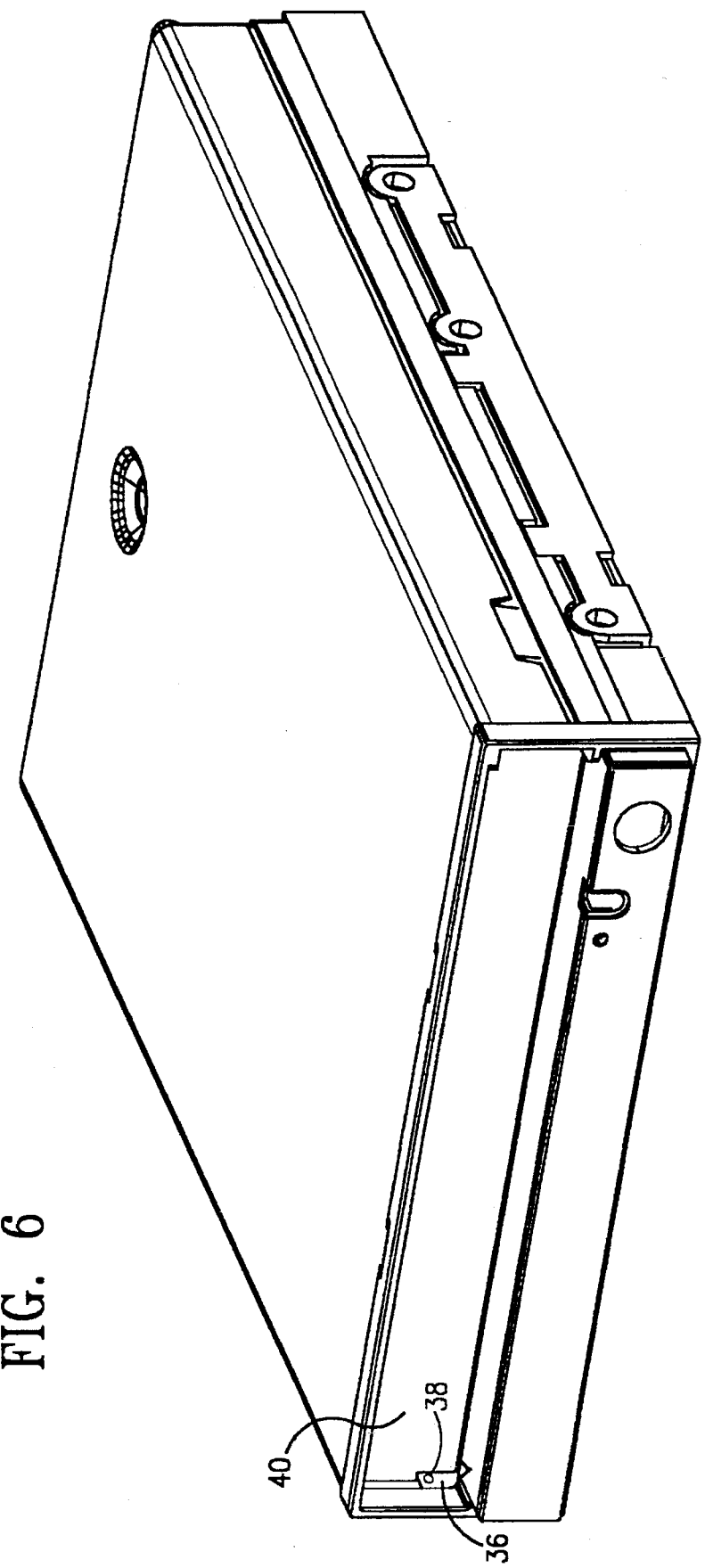
FIG. 6 shows the drive.
Figure 7:
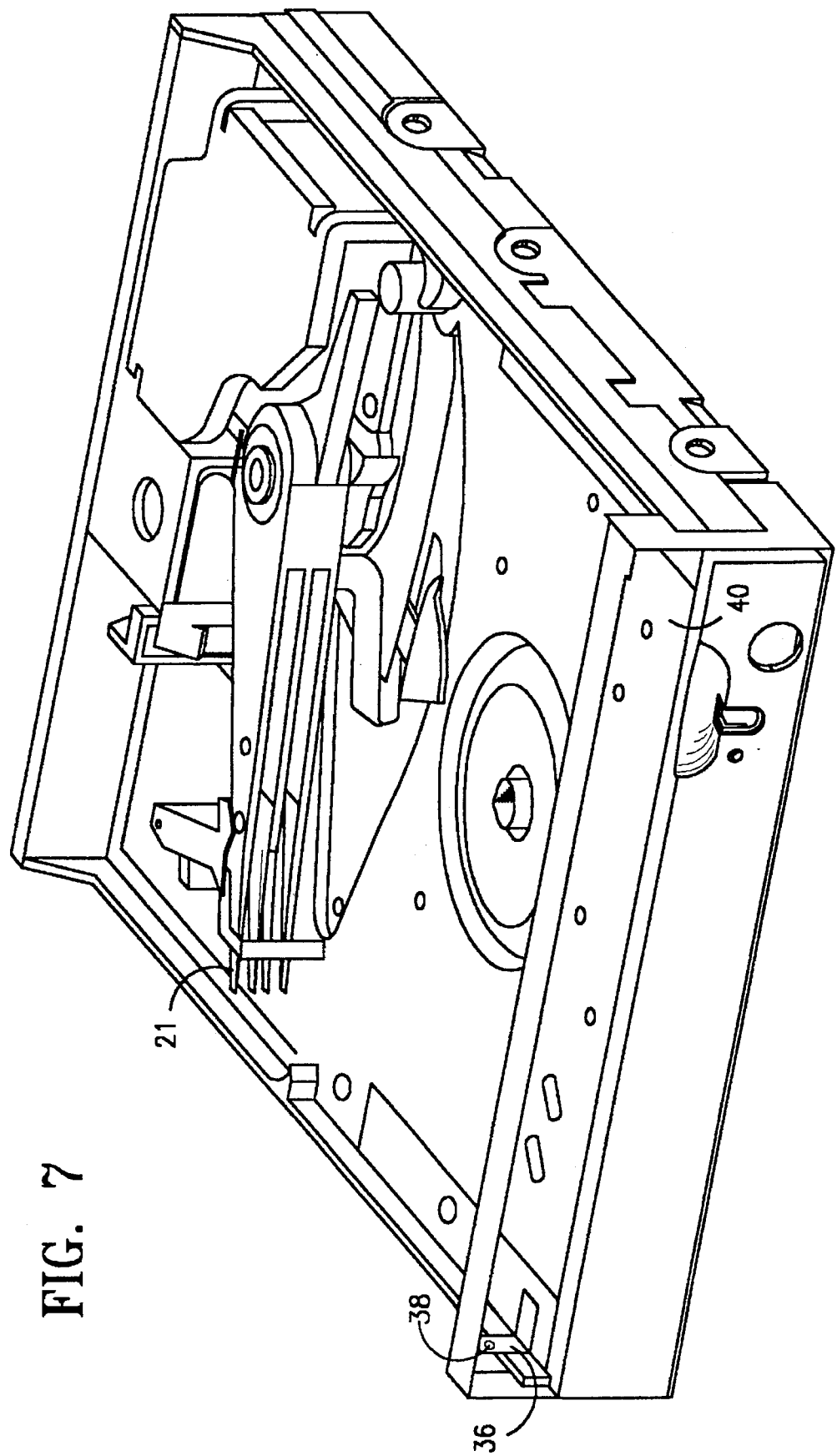
FIG. 7 shows the drive with the cover removed.
Figure 11:
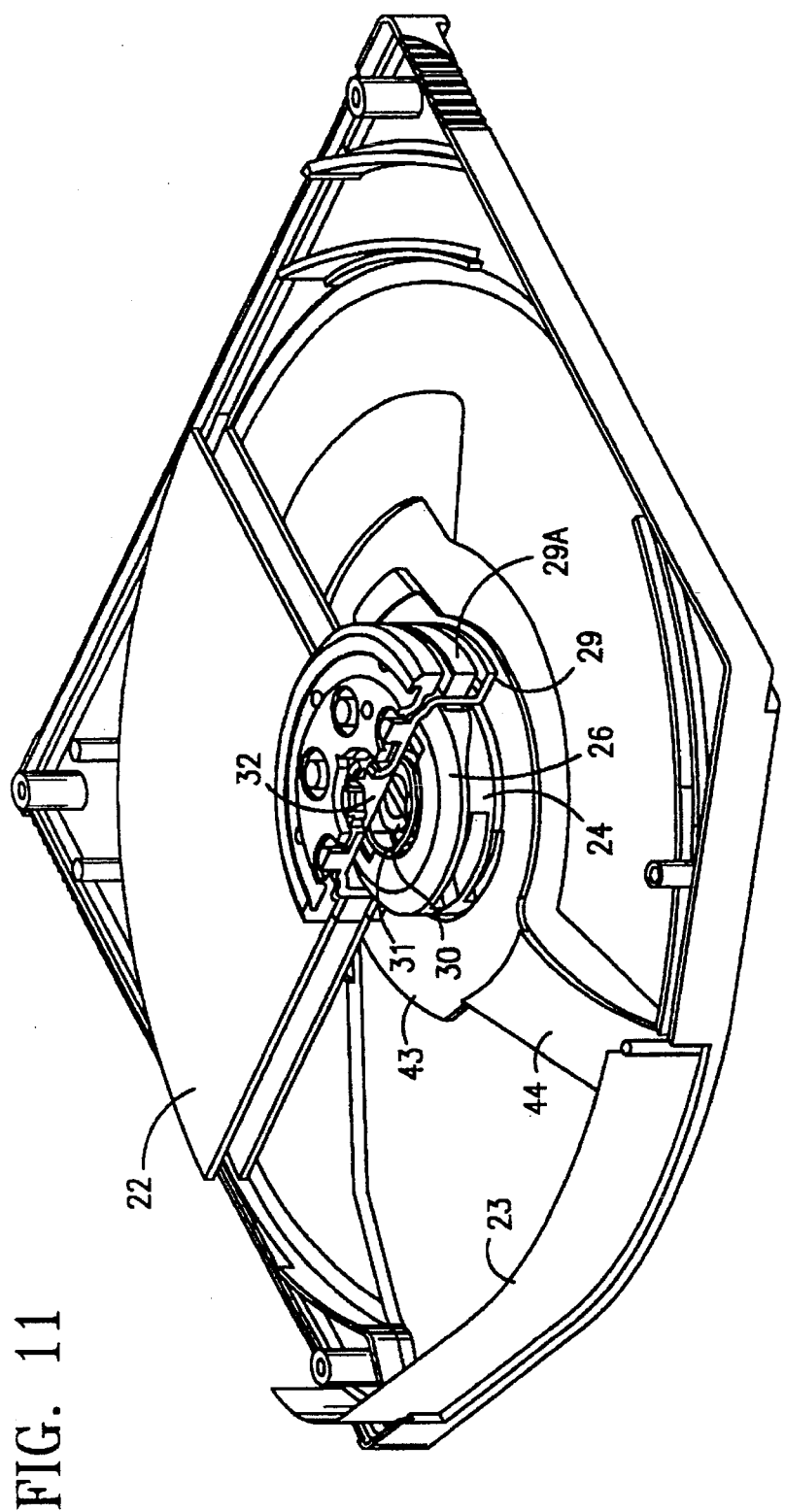
FIG. 11 is a broken away perspective view of a preferred embodiment of the invention with the door in the closed position.
Figure 12:
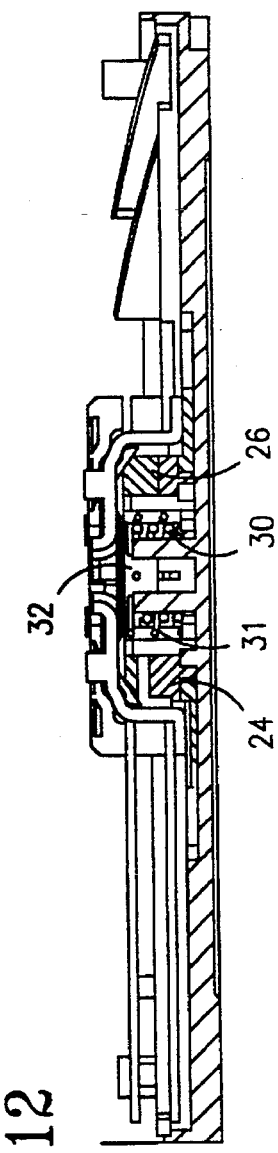
FIG. 12 is a cross-section of the cartridge of FIG. 11.

FIGS. 6 and 7 show the drive. A projection 38 (FIG. 8) on the flexible L-shaped arm 36 catches the hole 32 when the cartridge is inserted into the drive.

FIG. 8 shows the projection 38 in more detail. Special features include curved surfaces 42a and 42b on both sides of surface 42 from which the projection 38 extends. These surfaces control the penetration of the projection 38 into the groove 34 along the cartridge side. This ensures proper engagement of the projection 38 and hole 32.

FIGS. 9A–C and 10 show, top, front, side and isometric views, respectively, of the flexible arm 36 on which the projection 38 is mounted. The flexibility of arm 36 ensures that the projection 38 will catch the hole 32 in the door no matter where the cartridge is located in the slot 40 in the drive. This variation in cartridge location is caused by normal manufacturing tolerances.

Figure 13:
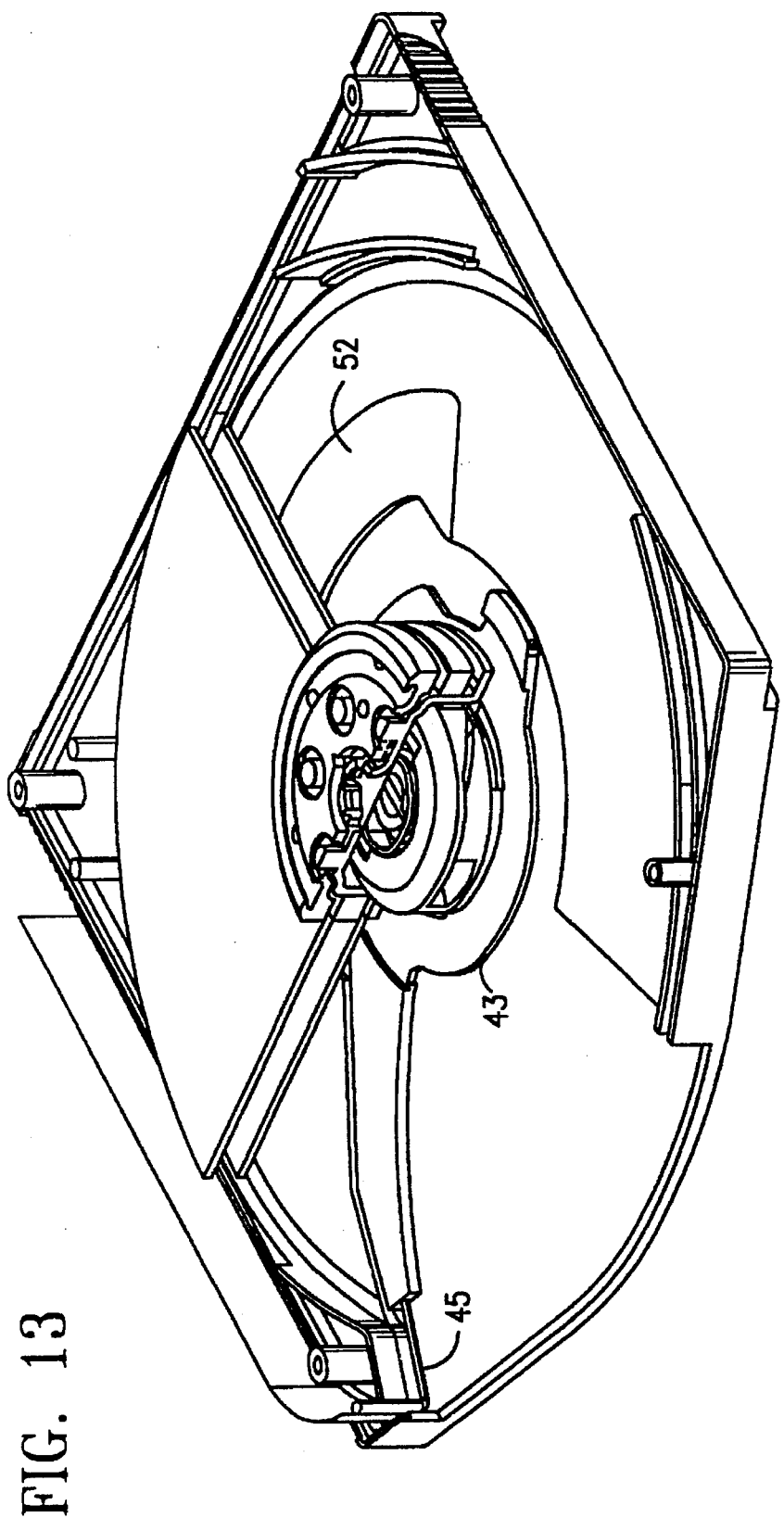
FIG. 13 is a broken-away perspective view of the cartridge of the preferred embodiment with the door in the open position.
Figure 14:
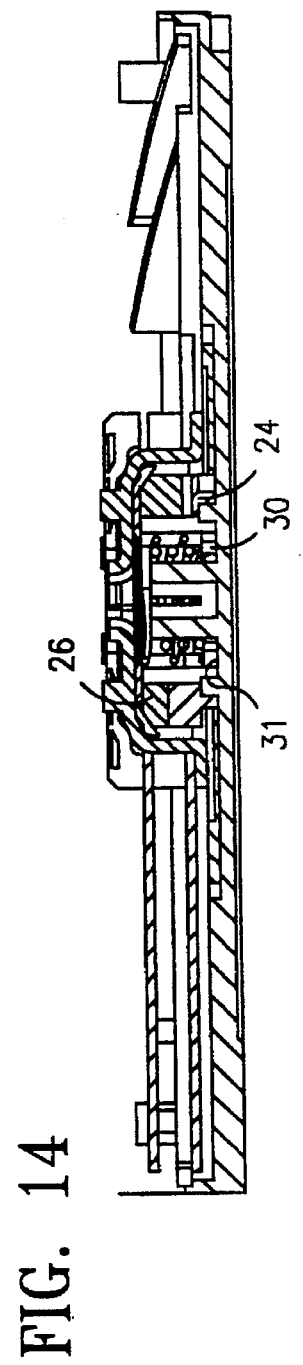
FIG. 14 is a cross-section of the cartridge of FIG. 13.
Figure 15:
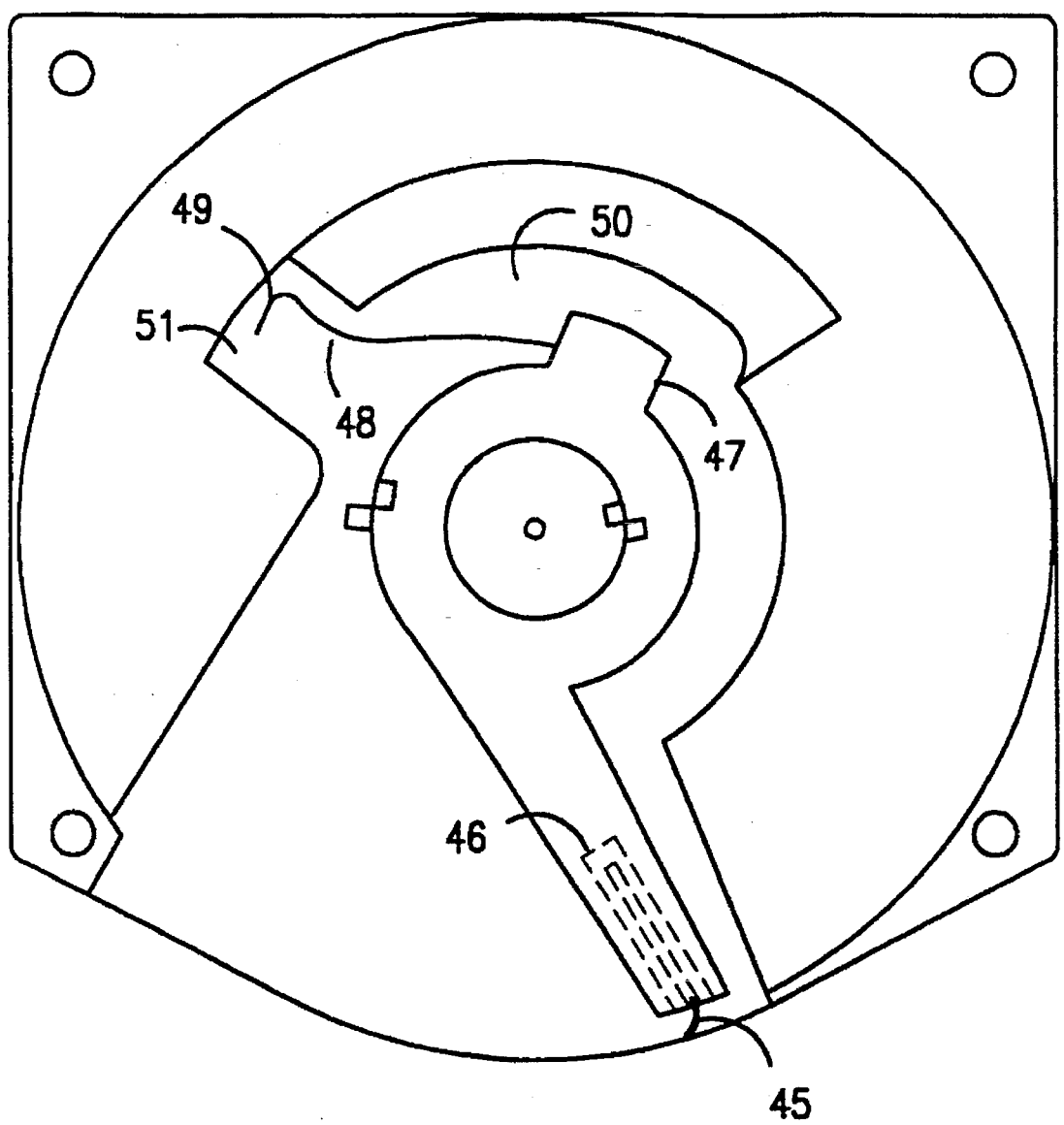
FIG. 15 is a top-plan view of the cartridge with the top shell and disks removed.

FIGS. 11–15 show a preferred embodiment of the invention in which the connection between the clamping mechanism and the door is a member 43 which is rotatable about the axis of the disks. Rotatable member 43 has an arm 44 extending radially toward the door 23. The terminal end of arm 44 is connected to the door by the wire 45. (FIGS. 13 and 15). Wire 45 is disposed in an opening 46 in the arm. The wire telescopes into and out of the opening 46 as the door travels through its stroke. This accommodates the varying radial distance to the door throughout its stroke.

A protrusion 47 on the arm has a spring 48 which provides the closing force needed to close the door through the last portion of its travel. The spring 48 has a bent end 49 which travels in the arcuate path 50. The arcuate path has a notch 51 at the closing end thereof. As the bent end 41 travels along arcuate path 50, it drops into the notch 51 at the closing end of the door stroke. This provides the extra force necessary to close the door.

Arcuate path 50 is a depression in the face of the cartridge. This depression has a cover 52 (FIG.13) so that the spring 48, and its bent end 49 travel in a closed path.

Other embodiments are within the true spirit and scope of the invention. The appended claims, are therefore, intended to cover all such embodiments.

What is claimed is:

1. A cartridge for a drive in which read/write heads read/record data on a recording medium comprising:
   a shell;
   a recording medium in said shell;
   an opening in said shell for access by said read/write heads from outside said shell to said recording medium;
   a flexible door covering said opening when said cartridge is removed from said drive;
   tracks along the front of said shell guiding said door outside of said shell, said flexible door sliding in said tacks from a closed position covering said opening, along the outside of said shell on said one side, to an open position when said cartridge is inserted into said drive;
   a member rotatable about the axis of said recording medium, said member being connected to said door; and
   a spring connected to said member for returning said door to said closed position when said cartridge is removed from said drive.

2. The cartridge recited in claim 1 having a rigid shell.

3. The cartridge recited in claim 1 wherein said shell has a from, back and two sides between substantially flat planar surfaces.

4. The cartridge recited in claim 3 wherein said shell has a small radius at the corner between said one side and said front.

5. The cartridge recited in claim 3 wherein said shell has a large radius curve in the middle of said front.

6. The cartridge recited in claim 5 wherein said shell has a straight section between said small radius curve and said large radius curve.

7. The cartridge recited in claim 6 wherein said door is flexible enough to follow said tracks around said large radius curve, through said straight section, and said small radius curve.

8. The cartridge recited in claim 3 wherein said shell has two halves joined along said front, back and two sides.

9. The cartridge recited in claim 1 wherein said door has a width approximately co-extensive with the width of said shell.

10. The cartridge recited in claim 9 wherein said door has a length long enough to cover said opening and short enough to fit along said one side.

11. The cartridge recited in claim 10 wherein the width and length of said door are constrained by the form factor of said drive and the size of said recording medium.

12. The cartridge recited in claim 1 wherein said drive has a slot into which said cartridge is inserted for engagement of said read/write heads with said recording medium, said drive having a projection at the side of said slot, said projection catching said flexible door as said cartridge is inserted into said drive, said projection pulling said door to the open position as said cartridge is inserted into said drive.

13. The cartridge recited in claim 12 wherein said flexible door has a hole in the end thereof, said hole catching on said projection to open said door.

14. The cartridge recited in claim 12 wherein said cartridge has a groove at the end of said tracks, said groove guiding said cartridge so that said projection catches on said hole in said door as said cartridge is inserted into said drive.

15. The cartridge recited in claim 12, wherein said projection is mounted on a flexible arm, said flexible arm accommodating the position of said projection so that it will catch on said cartridge door regardless of the location of the cartridge in said slot.

16. The disk drive recited in claim 12 wherein said drive has features including curved surfaces on both sides of said projection to control the penetration of said projection into said groove along the cartridge side.

17. The cartridge recited in claim 1 further comprising:

a protrusion on said member; and an arcuate path for said spring, said spring having a bent end, said bent end traveling in said arcuate path as said door moves from the open to the closed position.

18. The cartridge recited in claim 17 further comprising:

a notch at the end of said arcuate path, said bent end of said spring traveling into said notch to provide the force to close said door through the last portion of travel of said door to its closed position.

19. The cartridge recited in claim 17 further comprising:

a cover for said arcuate path, said spring traveling in the covered arcuate path as said door moves between the open and the closed position.

20. The combination of a cartridge containing a recording medium and a drive having read/write heads which read/record data on said recording medium, said cartridge comprising:

a shell;

a recording medium in said shell;

an opening in said shell for access by said read/write heads from outside said shell to said recording medium;

a flexible door covering said opening when said cartridge is removed from said drive;

tracks guiding said door outside of said shell when said door is moved from a closed position covering said opening to an open position when said cartridge is inserted into said drive;

a member rotatable about the axis of said recording medium, said member being connected to said door; and a spring connected to said member for returning said door to said closed position when said cartridge is removed from said drive.

21. The combination recited in claim 20 wherein said flexible door in said cartridge has a hole in the end thereof, said hole catching on said projection to open said door.

22. The combination recited in claim 20 wherein said cartridge has a groove at the end of said tracks, said groove guiding said cartridge so that said projection catches said door as said cartridge is inserted into said drive.

23. The combination recited in claim 22 wherein said drive has features including curved surfaces on both sides of said projection to control the penetration of said projection into said groove along the cartridge side.

24. The combination recited in claim 20 wherein said drive has a flexible arm on which projection is located, said flexible arm accommodating the position of said projection so that it will catch on said cartridge door regardless of the location of the cartridge in said slot.

25. The combination recited in claim 20 wherein said cartridge further comprises:

a protrusion on said medium; and an arcuate path for said spring, said spring having a bent end, said bent end traveling in said arcuate path as said door moves from the open to the closed position.

26. The combination recited in claim 20 wherein said cartridge further comprises:

a notch at the end of said arcuate path, said bent end of said spring traveling into said notch to provide the force to close said door through the last portion of travel of said door to its closed position.

27. The combination recited in claim 20 wherein said cartridge further comprises:

a cover for said arcuate path, said spring traveling in the covered arcuate path as said door moves between the open and the closed position.

* * * * *